Dec. 13, 1932.                C. S. ANTON                1,890,801

EGG CARTON

Filed March 17, 1931

CHRIST S. ANTON
INVENTOR

PEP Albert J. Fihe
ATTORNEY

Patented Dec. 13, 1932

1,890,801

UNITED STATES PATENT OFFICE

CHRIST S. ANTON, OF CHICAGO, ILLINOIS

EGG CARTON

Application filed March 17, 1931. Serial No. 523,222.

This invention relates to an improved egg carton, and has for one of its principal objects the provision of a carton or container for eggs or other fragile articles which, in addition to being quite inexpensive, shall be readily operated and provide a very safe and convenient means of handling eggs or the like.

One of the important objects of this invention is to provide in an egg carton means for containing, packing, and shipping eggs or the like with a minimum expenditure of time and trouble, and also with a guarantee of maximum security for the commodities themselves while in transit.

Another important object of the invention is to provide in an egg carton means for securing the same about the eggs whereby accidental disengagement of the carton from locked position will be positively prevented while at the same time the removal of the eggs when desired is greatly facilitated.

Another important object of the invention resides in the provision of a carton or container for eggs which while normally holding a dozen eggs can be very readily broken into two sections, each containing a half dozen eggs whereby retailing of the goods in these quantities is rendered permissible without increasing the cost of distribution.

Other and further important objects of this invention will be apparent from the disclosures in the accompanying drawing and following specification.

The invention, in a preferred form, is illustrated in the drawing and hereinafter more fully described.

Figure 1:
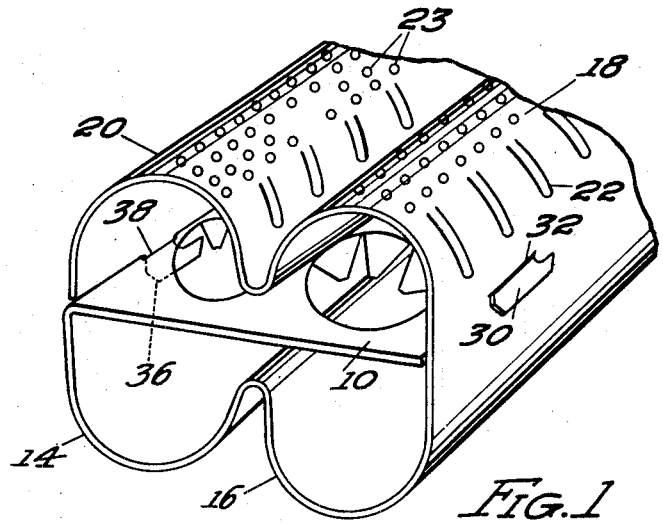
Figure 1 is an end perspective view of the improved egg carton of this invention, illustrating the distinctive features thereof.

The reference numeral 10 indicates generally the main or egg containing portion of the carton of this invention, this comprising essentially a flat strip of card-board or the like having a series of struck-out indentations 12 as is usual in the ordinary egg carton construction, the struck-out indentations being for the purpose of receiving and retaining the eggs when inserted thereinto.

Integral with the egg containing portions 10 is a bottom element made in two sections 14 and 16, and curved as best illustrated in Figure 1, this being for the suitable reception of the lower portions of the eggs inserted into the depressions 12.

Additionally integral with the element 10—14—16 is a pair of joined cover elements 18 and 20 respectively shaped similarly to the sections 14 and 16, and adapted to overlap and cover the tops of the eggs when the same are placed in the carton.

It will be noted that the cover element is shown in Figure 1 as provided with a plurality of corrugations 22 which are for the purpose of strengthening the walls, and which may be included in the bottom portions 14 and 16. These also provide for additional cushioning effect, as also the indentations 23.

Figure 2:
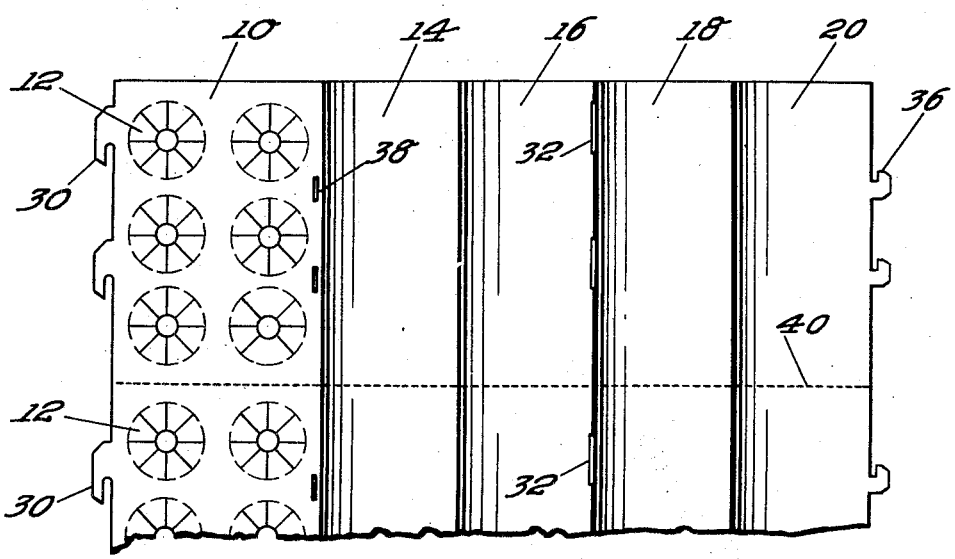
Figure 2 is a plan view of the blank from which the carton is constructed, parts being broken away.

A series of tongues 30 is formed integral with the outer edge of the egg receiving element 10, these tongues being adapted to fit in the corresponding slots 32 formed in the upper outer edge of the element 16 as best shown in Figures 1 and 2.

It will be noted that the tongues 30 are slightly offset with relation to the slots 32 so that it will be necessary to distort the material of the carton slightly from its normal position when inserting the tongues into the slots. However, after the same are inserted, the natural resiliency of the material causes the walls to assume their usual positions with respect to each other and the tongues will, thereupon, become locked in the slots.

After the tongues 30 are locked in the slots 32, the required number of eggs can be deposited in the depressions 12, and the cover member 18—20 is then brought into position as illustrated in Figure 1, this cover member being also provided with integral tongues 36 which fit into slots 38 in the upper outer edge of the egg receiving element 10. These tongues are also offset slightly so as to assure of a locking relation with the slots when the device is assembled.

Figure 3:
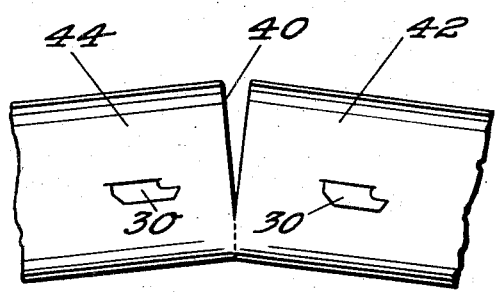
Figure 3 is a side elevation, illustrating the middle portion of the assembled carton with eggs therein, and being broken into two divisions.

A line of perforations or the like extends across the blank as illustrated at 40, and when the carton is assembled with the dozen eggs therein, the same may be broken into two portions 42 and 44 along the line 40 as illustrated in Figure 3. This is for the convenience of grocers, retailers, and the like who have calls for a half dozen of eggs occasionally and who, heretofore, have been confronted with the necessity of either removing half of the eggs from a twelve egg carton or otherwise packing a new carton with the required amount. The fact that there are double tongue and groove constructions on both sides of the perforated line 40 will assure a substantial structure even when the carton is divided, and furthermore, the tongues can be prevented from inadvertently slipping through the slots by pasting a strip of adhesive paper or the like thereover after the carton is assembled. This adhesive paper may, if desired, bear the name and address of the distributor, grocer, or the like.

It will be evident that herein is provided an egg carton which will be considerably less expensive than the ordinary cartons now on the market in that a great amount of material heretofore thought necessary in the construction of such cartons is eliminated, while at the same time a substantial package results which can be readily assembled, and which, moreover, will protect the contents against any ordinary accidents or rough handling. Additionally, the assembled carton can be readily broken into two parts for the ready sale and distribution of a half dozen of eggs, and the cost of the container for such half dozen of eggs is simultaneously automatically halved.

I am aware that many changes may be made and numerous details of construction varied throughout a wide range without departing from the principles of this invention, and I, therefore, do not purpose limiting that patent granted hereon otherwise than as necessitated by the prior art.

I claim as my invention:

1. An egg carton, composed of a single blank, one end of the blank comprising a flat egg supporting element having indentations therein for receiving eggs, and a pair of shell-like top and bottom sections adapted to be disposed respectively about the egg receiving section, said bottom section having slots therein adapted to receive tongues integral with the egg receiving section, and additional tongues on the end of the cover member adapted to be received in slots in the edge of the egg receiving member.

2. An egg carton, composed of a single blank, one end of the blank comprising a flat egg supporting element having indentations therein for receiving eggs, and a pair of shell-like top and bottom sections adapted to be disposed respectively about the egg receiving section, said bottom section having slots therein adapted to receive tongues integral with the egg receiving section, and additional tongues on the end of the cover member adapted to be received in slots in the edge of the egg receiving member, all of said egg receiving elements and top and bottom members being integral with each other.

3. An egg carton, composed of a single blank, one end of the blank comprising a flat egg supporting element having indentations therein for receiving eggs, and a pair of shell-like top and bottom sections adapted to be disposed respectively about the egg receiving section, said bottom section having slots therein adapted to receive tongues integral with the egg receiving section, and additional tongues on the end of the cover member adapted to be received in slots in the edge of the egg receiving member, and a transverse line of perforations across the carton for readily dividing the same into two halves.

4. An egg carton, composed of a single blank, one end of the blank comprising a flat egg supporting element having indentations therein for receiving eggs, and a pair of shell-like top and bottom sections adapted to be disposed respectively about the egg receiving section, said bottom section having slots therein adapted to receive tongues integral with the egg receiving section, and additional tongues on the end of the cover member adapted to be received in slots in the edge of the egg receiving member, and a transverse line of perforations across the carton for readily dividing the same into two halves, the line of perforations extending through the egg receiving section, the space between the indentations in said section being greater adjacent the line of perforations than between other indentations.

In testimony whereof I affix my signature.

CHRIST S. ANTON.